Patented Dec. 11, 1951

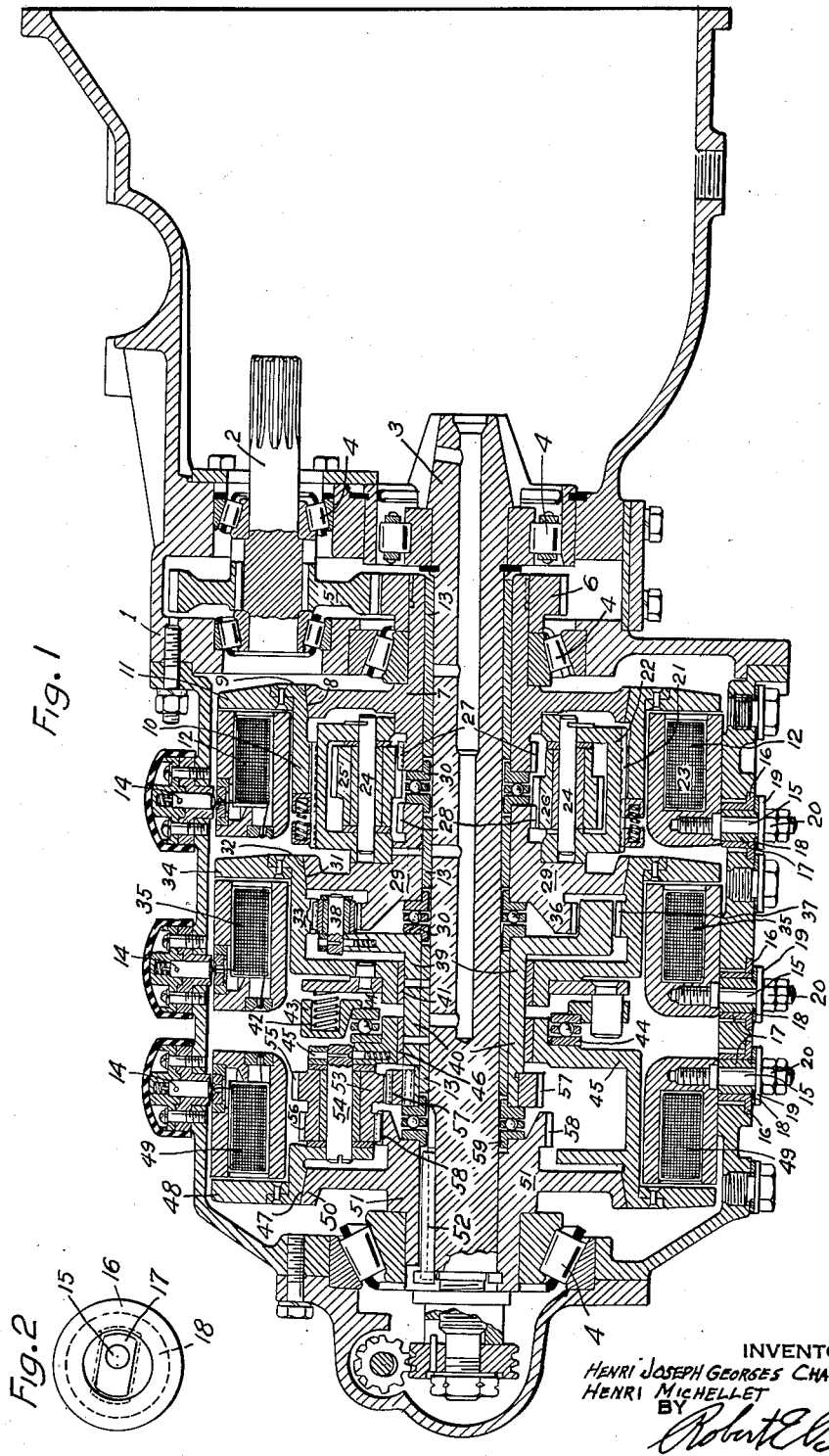

2,578,399

UNITED STATES PATENT OFFICE 2,578,399

ELECTROMAGNETIC CHANGE-SPEED MECHANISM FOR AUTOMOTIVE VEHICLES

Henri Joseph Georges Chatelet, Puteaux, and Henri Michellet, Paris, France

Application December 8, 1949, Serial No. 131,714
In France September 6, 1949

2 Claims. (Cl. 74—765)

The present invention relates to change-speed mechanisms of the electro-magnetic type wherein the several speeds or gear ratios are obtained by the selective energization or de-energization of a number of electro-magnets the combination of which ensures the transmission of the power torque through the intermediary of gears or pinions which are in constant mutual engagement, clutch elements being interposed for bringing to live or to idle condition each set or stage of gears or pinions according to requirements.

Mechanisms of the aforesaid type such as they are known at the present time are generally heavy and cumbersome. Furthermore they have the disadvantage of requiring a current consumption which is frequently excessive, particularly on certain automotive vehicles. In some of these mechanisms the electro-magnets are energized only for certain speeds or gear ratios but their arrangement permits neither to obtain the required torques nor to build a gear box capable of ensuring a satisfactory efficiency while having a sufficiently small volume to enable the same to be mounted on small size vehicles.

It is an object of the invention to provide a change-speed mechanism of the aforesaid type but having a sufficiently reduced weight and volume as to lend itself to fitting upon any automotive vehicle, even of a small power, and wherein the current consumption is minimized during the operation of the mechanism.

Another object of the invention is to provide a mechanism as aforesaid permitting under a minimum volume an absolutely reliable transmission of energy irrespective of the operative conditions of the vehicle.

A further object of the invention is to provide an electromagnetic change-speed mechanism comprising a number of sets or stages of gears which are constantly in engagement and each of which is associated with one stationary electromagnet the energization or de-energization of which controls a clutch including friction cones, thereby altering the conditions of the power transmission through the corresponding set or stage of gears, the associated friction cones which belong to each clutch having such a wedging angle and such a relative hardness as to enable an efficient power transmission as well as ready de-clutching without binding or jamming to be ensured responsive to the action of the electro-magnet.

A still further object of the invention is to provide a mechanism as aforesaid wherein the clutch friction cones are arranged adjacent the longitudinal axis of the mechanism and have an angle of slant or inclination comprised between 7° 30' and 9° (preferably between 8° and 8° 30') so as to ensure a reliable wedging action and a ready de-clutching without any binding or jamming, the degrees of hardness of the male and female cones in each set being different.

Still a further object of the invention is to provide a mechanism as aforesaid wherein the pinions of the gear sets have inclined teeth, thereby normally to urge the clutch cones toward each other and to facilitate the clamping action between them when the electro-magnets are de-energized, means including eccentrics on the casing of the mechanism being moreover provided for adjusting the electro-magnet air gap.

With these and such other objects in view as will incidentally appear hereafter, the invention comprises the novel construction, arrangement and combination of parts that will now be described in detail with reference to the accompanying diagrammatic drawings, exemplifying the same and forming a part of the present disclosure.

In the drawings:

Figure 1 is a longitudinal sectional view of a change-speed box embodying the mechanism according to the invention as applied to an automotive vehicle comprising four speeds or gear ratios in the forward drive and a reverse drive.

Figure 2 is a diagrammatic plan view drawn to a larger scale showing the device for adjusting the narrow air gap between the electro-magnets.

The illustrated change-speed gear box which is characterized structurally by its extreme compactness comprises a casing 1 advantageously made of a light metal or alloy, open at its right end side (viewing the drawing) for permitting the mounting of the driving or primary shaft 2 and the accommodation of the driven shaft 3 which is located axially of the box. The rotation of the rotary members in the casing or through side plates of the casing is facilitated by roller bearings designated generally by 4.

The driving shaft 2 carries a wheel 5 having spur teeth and terminates in the bearings 4 which act as thrust bearings. The wheel 5 meshes with another spur wheel 6 keyed to an extension of a plate 7 having a friction cone 8 co-operating with a female cone 9 carried by a ring member 10 having a radial edge 11 which co-operates while leaving a very narrow air gap with an electro-magnet 12 for the reverse drive the purpose of which is indicated hereafter.

The plate 7 and its extension rotate with respect to the driven shaft 3, a friction ring 13 (preferably made of an anti-friction metal or alloy) being interposed as shown. It will be seen from the continuation of this specification that similar friction rings 13 permit the other members to revolve with respect to the said shaft.

Advantageously the friction cones 8, 9 are made of steels having different degrees of hardness, the cone 8 being preferably the harder cone for facilitating machining and having its friction zone case hardened, while the female cone 9 and the ring member 10 are preferably made of nickel-chromium steel having a resistance to breakage ranging between 115 and 120 kilograms per square millimeter. The degree of slanting of the cones 8, 9 to the longitudinal axis of the gear box is between 7° 30' and 9° and preferably between 8° and 8° 30' depending upon the uses that are contemplated, such angular values giving the optimum wedging angle to secure a satisfactory efficiency and preventing, jointly with the nature of the cones, their becoming jammed in the course of the operation. The coming of the mechanical coupling thus constructed into driving engagement is easily performed, the transmission having a good efficiency and the release through the declutching taking place swiftly.

As will be seen from the drawing, the electromagnet 12 is adapted to co-operate with the annular plate 11 which is closed up by the flange on the ring member 10 while leaving a very narrow air gap, and it operates by concentrating the magnetic flux so as to ensure a very high efficiency. This electro-magnet is fed by the upper contact terminal of known type which is designated generally by 14 and it is secured to the casing as indicated in the lower portion of the drawing.

Proper securing is performed by a pin 15 having screw-threaded ends and screwed into the body of the electro-magnet. The casing 1 is provided at a corresponding position with a hole through which is accommodated an eccentric cage 16 (Figs. 1 and 2) formed by a socket member having a flange the outer face of which is serrated or ribbed. Inside the cage 16 is received an eccentric 17 terminating by an end portion having flats and having an eccentered bore for the passing of the pin or axis 15 as shown on Fig. 2.

It will be easily understood from the foregoing that the position of the pin or axis 15 and consequently of the electro-magnet 12 with respect to the casing will vary depending upon the angular setting of the eccentric 17, thereby permitting the air gap along the electro-magnet to be adjusted to suit requirements. A washer 18 made of a soft metal or alloy having a bore matching the flat on the eccentric 17 is applied against the outer face of the eccentric cage 16 through the medium of a plain washer 19 and a nut 20. The pressure causes the soft metal of which the washer 18 is made to be penetrated by the ribs of the eccentric cage and thus prevents any angular displacement of the eccentric 17 after the adjustment.

The ring member 10 is splined, as shown at 21, upon a cage 22, elastic members or springs 23 being interposed which urge the cones 9, 8 toward each other. The cage 22 is part of a differential having a transmission ratio equal to 1:1 which permits the reverse drive as hereafter described. Through the cage 22 are engaged lengthwise axes 24 upon which meshing pinions 25, 26 can revolve idly, said pinions respectively engaging spur teeth 27, 28. As illustrated, the teeth of these pinions 25, 26 which are preferably spur teeth in the embodiment shown, occupy such a length of the cage 22 that they, moreover, mesh respectively with the teeth 27 on the plate 7 and with the teeth 28 on a plate 29. The operation of this differential stage is explained hereafter.

A ball thrust bearing 30 is interposed between the plates 7 and 29 so as to permit their relative rotation. The plate 29 is formed on its periphery with a male cone 31 which co-operates with a female cone 32. This cone clutch is similar to the one described in the foregoing statement. The cone 32 is formed on a ring member 33 which carries an annular plate 34 co-operating with an electro-magnet 35 similar to the electro-magnet 12 and arranged in a similar way.

The plate 29 has sun teeth 36 arranged opposite to the teeth 37 on the ring member 33, planet gears 38 which form an epicyclic gearing being suitably interposed. The teeth of these several gears are preferably skew teeth and so inclined as mutually to apply the cones 31, 32 together.

A ball thrust bearing 30' is interposed between the plate 29 and the planet carrier 39 so as to permit a relative angular movement between them.

The planet gears 38 are mounted upon a planet gear carrier 39 extending in the form of a sleeve 40 pivotally carried by the shaft 3, a friction ring 13 being interposed as shown. Another friction ring 41 permits the sleeve 40 to revolve about the ring member 33 which is urged rightward (viewing the drawing) by compression springs 42 abutted to an abutment plate operatively connected to this ring member and to an annular cup member 43 which is in turn abutted to a ball thrust bearing 44 which permits a relative rotation of the ring member 33 with respect to a planet gear carrier 45 pivotally supported by a friction ring 46 upon the sleeve 40.

The planet gear carrier 45 is in the shape of a mutilated cage and extends in the form of a friction cone 47 and an annular plate 48 which cooperates with an electro-magnet 49 similar to the electro-magnet 12 and mounted in similar fashion. The cone 47 in turn co-operates with a male cone 50 carried by a plate 51 keyed to the driven shaft 3 at 52. The cones 47 and 50 are similar to the cones 8 and 9, so that they will not be further described.

The planet gear carrier 45 permits a number of planet gears 53 idly supported by axes 54 to be suitably carried. Each planet gear 53 has a pair of teeth sets 55, 56 which mesh respectively with pinions 57, 58 carried by the sleeve 40 and by extension of the plate 51, so as to form a reducing gear. The teeth of all these gears and pinions are inclined as above described so as to urge the friction cones 47, 50 toward each other. A ball thrust bearing 59 is interposed between the sleeve 40 and the plate 51 to permit their relative angular displacement.

The operation of the mechanism which has just been described is as follows:

The mechanism which is specially adapted for being fitted upon an automotive vehicle such as a motor car permits, owing to the operational combination of the electro-magnets (one electromagnet being provided for each gear stage) four forward speeds and one reverse drive speed to be obtained, the electrical circuits which energize the electro-magnets and which are associated with the change-speed lever or knob not being represented in the drawing because as such they do not belong to the invention while, moreover, their arrangement will be obvious for anyone skilled in the art particularly in view of the following explanation:

Considered generally, the mechanism according to the invention uses the operational combination of the two electro-magnets 35 and 49 for permitting the four forward drive speeds, while the electro-magnet 12 permits the reverse drive speed to be obtained. The mechanical transmission corresponding to each of the said speeds or gear ratios will now be explained at length.

When it is desired to obtain the first or lower forward drive speed, both electro-magnets 35 and 49 should be energized, whereby the annular plates 34 and 48 are clamped and held motionless, the cones 31, 32 and 47, 50 being unclutched, while the spring 42 is tightened. This urging of the plates 34 and 48 which takes place against the resistance of the spring 42 and while the teeth of the co-operating gear sets are urged into operation is rendered easy and efficient due to the fact that the electro-magnets are so mounted as to concentrate the magnetic flux and to the narrowness of the air gap. The transmission then takes place as follows: The rotational power derived from the driving shaft 2 is transmitted by the tooth wheels 5 and 6 to the plate 7, then through the cones 8, 9 which engage the ring member 10 which consequently rotates with the plate 7 while driving the planet gears 25, 26 which remain motionless upon their axes 24 and which, by meshing with the teeth 28, revolve the plate 29. This transmission is maintained as long as the electromagnet 12 is de-energized. As the ring member 33 is held steady with the plate 34, the sun gear 36 revolves the planet gear 38 which meshes therewith, the gear 38 rolling along the teeth 37 while revolving the planet gear carrier 39, the ratio of transmission being indicated by the formula $$\frac{n}{N+n}$$

wherein $n$ designates the number of teeth of the sun gear 36 and N the number of teeth 37. Therefore the sleeve 40 revolves at the same speed with the pinion 57 carried thereby. As the planet gear carrier 45 is held motionless together with the plate 48, the pinion 57, which meshes with the pinion 55 revolves the planet gears 53 about their stationary axes 54. This rotational motion is transmitted by the pinion 56 to the pinion 58 on the plate 51, the speed ratio being equal to 1/K, wherein K may be easily calculated from the number of teeth of the pinions 55 to 58 which form the reducing gear. This rotation is consequently transmitted to the secondary shaft 3, and the speed reduction obtained between the primary shaft 2 and the secondary shaft 3 is consequently equal to $$\frac{n}{N+n}\times\frac{1}{K}$$

which corresponds to the first or lower speed or gear ratio.

When it is desired to obtain the second speed or gear ratio, it is only sufficient to cause the electro-magnet 35 to be energized. Thus the cones 47, 50 are brought into mutual engagement responsive to the dual action of the spring 42 and the urging derived in the same direction from the sloping position of the teeth of the reducing step which corresponds to the electro-magnet 49. The transmission of the motive power is performed, as previously described, to the sleeve 40, the reduction ratio being equal to $$\frac{n}{N+n}$$

The planet gear carrier 45 is then revolubly connected to the plate 51 and consequently to the driven shaft 3. The meshing of the pinions 56, 58 prevents the planet gears 53 from rotating about their axis 54. The locking of these planet gears owing to the friction which takes place between the cones 47, 50 permits the planet gear carrier to be driven owing to the engagement of the teeth of the pinions 55 and 57. The assembly thus forms a unit which is operatively connected to the sleeve 40. The second speed or gear ratio is thus simply equal to $$\frac{n}{N+n}$$

The third speed or gear ratio is obtained by de-energizing the electro-magnet 35 and energizing the electro-magnet 49. The combined action of the spring 42 and the slanting teeth brings into mutual engagement the friction cones 31, 32 which operatively interconnects the plate 29 and the ring member 33. Therefore the planet gears 38 remain motionless owing to their engagement with the teeth 36, 37 and revolve the planet gear carrier 39 at the same speed as the plate 29 to which it is operatively connected angularly speaking. The rotation of the sleeve 40 is transmitted, as set forth, for the first speed, to the secondary shaft 3, the reduction ratio being 1/K. This represents the third speed.

When it is desired to obtain the fourth speed, all the electro-magnets should be de-energized, the transmission taking place as previously stated in a separate manner and with a 1:1 ratio since the several steps are angularly interconnected. This represents the direct drive from the engine to the vehicle wheels.

The reverse drive is obtained by energizing all the electro-magnets. The cones 8 and 9 are then declutched and the plate 11 is held stationary together with the ring member 10 and the cage 22 carrying the axes 24 of the planet gears 25, 26. Rotation of the plate 7 is therefore transmitted by the pinion 27 to the gears 25, and then by the latter to the pinion 26 and 28, the direction of rotation being, however, reversed, while the speed transmitting ratio is 1:1. Consequently the plate 29 is driven in the opposite direction. From this plate the transmission takes place as described in connection with the first or lower forward speed.

It will be seen from the foregoing that the improved mechanism according to the invention permits a transmission of the driving torque to be achieved under optimum conditions at all speeds while keeping down the electric current consumption to a very low value since, when the vehicle runs in direct drive, as is most frequently the case, the current consumption is equal to zero. Moreover the number of electro-magnets included in the mechanism is limited to a minimum value since all possibilities of permutation are utilized thanks to the improved construction. Therefore the entire weight of the gear box is small.

Minor constructional details may be varied without departing from the ambit of the invention within the scope of mechanical equivalencies.

What is claimed is:

1. An electro-magnetic change-speed mechanism comprising a casing, a driving shaft, a primary spur wheel fast with the driving shaft, a driven shaft, a secondary spur wheel idle upon said driven shaft and constantly meshing with said primary wheel, a primary plate operatively connected to said secondary wheel, an electro-magnet for the reverse drive carried by said casing, a secondary revoluble plate of annular shape arranged in front of said reverse drive electro-magnet, friction cones on the primary and secondary plates respectively and constituting a friction clutch, an elastic member normally urging said friction cones together, a cage angularly movable with the secondary plate, this secondary plate being axially slidable upon said cage, spur teeth on said primary plate for the reverse drive, a primary second speed plate, spur teeth on the last-cited plate, pinions revolubly carried by said reverse drive cage and constantly meshing together and with the teeth of the primary reverse drive plate and of the primary second speed plate, a second speed electro-magnet, a secondary plate for the second speed slidably supported in front of the electro-magnet, male and female cones on the primary and secondary plates for the second speed, an elastic member normally to urge said cones together, teeth on said two plates disposed at an angle to the axis of the plates, a planet gear carrier for the second speed, planet gears having teeth disposed at an angle to the axis of the planet gears and constantly meshing with the plate teeth, the inclination of said teeth normally urging the friction cones together, a pinion mounted on the planet gear carrier for the second speed, an electro-magnet for the third speed, a primary magnetic plate for the third speed, the last-named plate being axially disposed in front of the corresponding electro-magnet, a planet gear carrier for the third speed operatively connected to this primary plate, a secondary third speed plate fast with the driven shaft, friction cones on said third speed primary and secondary plates, a pinion carried by said secondary third speed plate, and planet gears having two sets of teeth of different pitch diameter supported by the third speed carrier and constantly meshing with the secondary third speed plate pinion and with the pinion on the second speed plate, the teeth of said pinions and of the planet gears being arranged to apply the corresponding friction cones against each other so that the first speed is obtained by energizing the second speed and the third speed electro-magnets, while direct drive is obtained by deenergizing said electro-magnets.

2. An electro-magnetic change-speed mechanism according to claim 1, having holes in the casing, screw-threaded pins rigid with said electro-magnets and disposed in said holes, an eccentric cage received in each hole, an eccentric revolubly carried in said cage and outwardly projecting therefrom, flats on the projecting part of said eccentric, a flange on said eccentric cage, ribs on said flange, a primary soft metal washer having a hole matching the shape of the projecting part of the eccentric, a secondary hard metal washer pressed against said primary washer, and tightening nuts clamping the primary washer against the cage flange and causing the same to penetrate into the spaces between the flange ribs so as to hold the eccentric against swinging after tightening.

HENRI JOSEPH GEORGES CHATELET.
HENRI MICHELLET.

REFERENCES CITED

The following references are of record in the file of this patent:

UNITED STATES PATENTS

| Number | Name | Date |
| --- | --- | --- |
| 808,221 | Simonds | Dec. 26, 1905 |
| 1,296,533 | Landis | Mar. 4, 1919 |
| 1,588,602 | Midgley | June 15, 1926 |
| 1,598,586 | Lanquetin | Aug. 31, 1926 |
| 2,084,522 | Cotal | June 22, 1937 |
| 2,455,900 | Yardeny et al. | Dec. 7, 1948 |

FOREIGN PATENTS

| Number | Country | Date |
| --- | --- | --- |
| 811,577 | France | Apr. 17, 1937 |
| 907,349 | France | Mar. 8, 1946 |